UNITED STATES PATENT OFFICE.

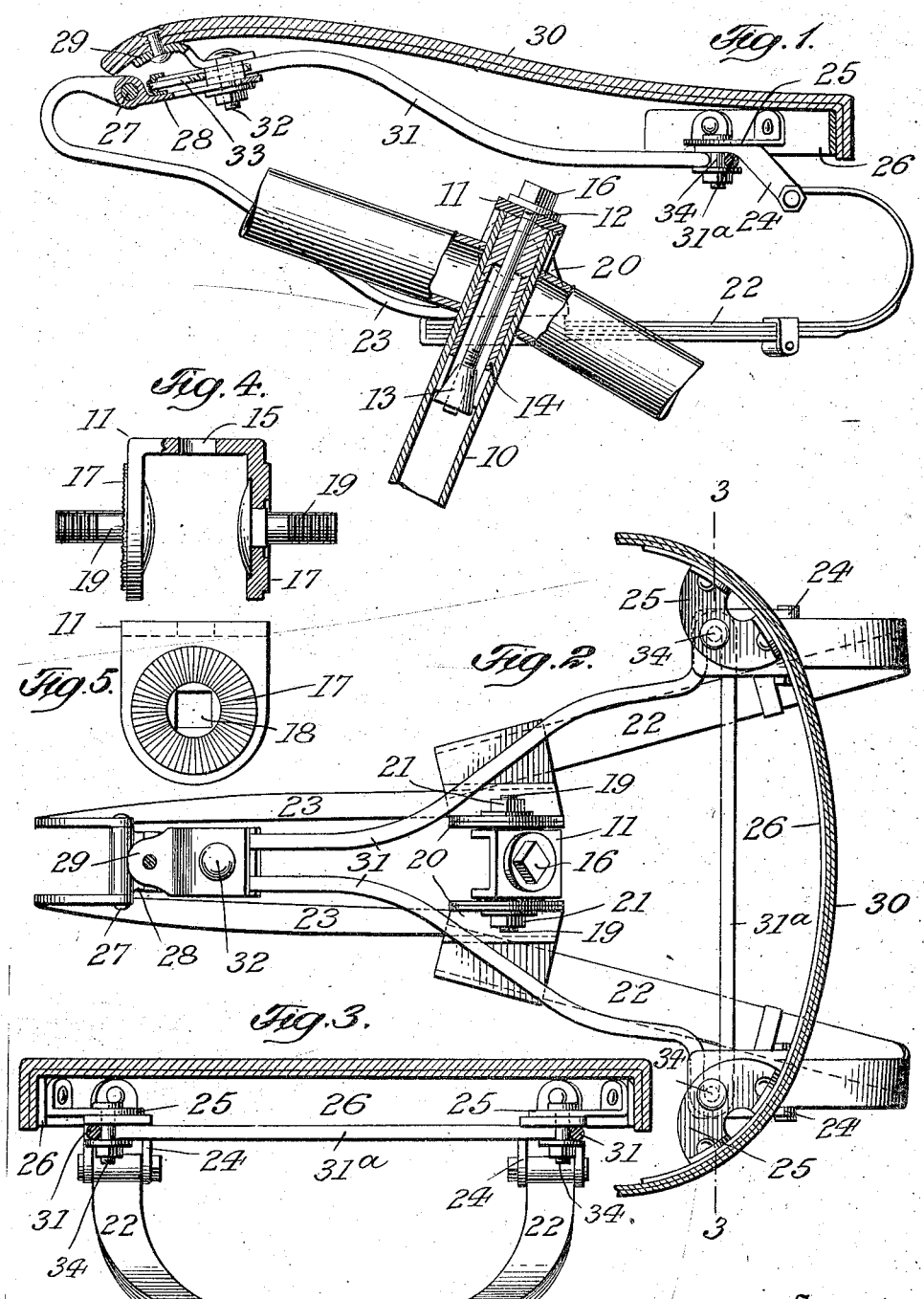

FREDERICK MESINGER, OF NEW YORK, N. Y.

SADDLE FOR MOTOR-CYCLES.

1,045,999.  Specification of Letters Patent.  Patented Dec. 3, 1912.

Application filed June 18, 1912. Serial No. 704,263.

*To all whom it may concern:*

Be it known that I, FREDERICK MESINGER, a citizen of the United States, residing at New York city, county and State of New York, have invented a new and Improved Saddle for Motor-Cycles, of which the following is a specification.

This invention relates to a saddle for motor cycles which posesses great resiliency, is of superior strength, and may be readily adjusted.

In the accompanying drawing: Figure 1 is a side elevation partly in section of a saddle embodying my invention; Fig. 2 a plan with some of the parts omitted; Fig. 3 a section on line 3—3, Fig. 2; Fig. 4 a detail of the yoke, and Fig. 5 a side view of the yoke.

The saddle post 10 is straddled by a yoke 11 which is secured to the post by means of a bolt 12 having a lower coniform nut 13 which engages a slitted bushing 14 inclosed within the post. The upper end of bolt 12 passes through an aperture 15 of yoke 11 and carries a head 16. Each of the two cheeks of yoke 11 is provided with an outer corrugated face 17 and with a squared aperture 18 adapted for the accommodation of a screw 19. Yoke 11 is flanked by a pair of L-shaped boxes 20 having apertured sides which engage faces 17 and are held thereto by the screws 19 and by nuts 21 carried by said screws. It will be seen that by the means described, the boxes are securely held to the yoke by frictional contact and that their dip may be readily adjusted to change the height of the saddle.

Boxes 20 are adapted to accommodate the inner or front ends of a pair of back or cradle springs 22 and also the inner or rear ends of a pair of front springs 23. Cradle springs 22 may be composed of a plurality of leaves at their forward end and of a single leaf at their rear end, said leaf being coiled upwardly and forwardly as shown. Each spring 22 is bolted at said rear end to arms 24, secured to a bracket 25 which is in turn secured to the arched cantle 26.

The forward ends of the front springs 23 are coiled upwardly and backwardly and are fulcrumed at 27 to a common plate 28 arranged beneath the nose piece 29 of the saddle top 30. Between plate 28 and nose piece 29 are accommodated the forwardly extending shanks of a top or stay spring 31, which are adjustably secured to said parts by a bolt 32 and set screw 33 in known manner. The stay spring 31 is so shaped that at its rear end, its shanks diverge from each other and are here connected by an integral transverse arm or bar 31$^a$. At the junction of each shank with said arm, the stay spring is coiled around a bolt 34 depending from bracket 25. In this way the arm 31$^a$ constitutes a brace for cantle 26 and extends in the direction of a chord thereto, so that the cantle is reinforced and held against bending without the addition thereto of flanges or other reinforcing means.

It will be seen that by the construction described, the saddle possesses a marked degree of resiliency, that it may be readily adjusted in all of its parts, and that it will securely maintain its adjustment after being set.

I claim:

1. A saddle provided with a member adapted to be secured to a saddle post, a box, means for adjustably securing said box to said member, a front spring and a cradle spring fitted to said box at their inner ends, a saddle top, and means for securing the outer ends of said springs to said top.

2. A saddle provided with a member adapted to be secured to a saddle post, a pair of boxes, means for adjustably securing said boxes to said member, a front spring and a cradle spring, the inner ends of which are fitted to said boxes, a saddle top, and means for securing the outer ends of said springs to said top.

3. A saddle provided with a yoke adapted to straddle a saddle post, a pair of boxes, means for adjustably securing said boxes to said yoke, a pair of cradle springs and a pair of front springs fitted to said boxes at their inner ends, a saddle top and means for securing the outer ends of said springs to said top.

4. A saddle provided with a yoke adapted to straddle a saddle post and having a pair of corrugated cheeks, a pair of L shaped boxes engaging said cheeks, bolts that adjustably connect the boxes to the yoke, a front spring and a cradle spring, the inner ends of which are fitted to said boxes, a saddle top, and means for securing the outer ends of said springs to said top.

5. A saddle provided with an arched cantle, a bent stay spring having a transverse rear arm that extends in the direction of a chord to said cantle, brackets carried by the cantle, and means for securing the stay spring to said brackets.

FREDERICK MESINGER.

Witnesses:
AUGUST ERB,
JULIUS REICKELT.

Copies of this patent may be obtained for five cents each, by addressing the "Commissioner of Patents, Washington, D. C."